May 11, 1954     A. M. GILDERSLEEVE     2,678,139
TRAILER OR LIKE BODY FREIGHT LOADING DEVICE
Filed Aug. 25, 1951     2 Sheets-Sheet 1
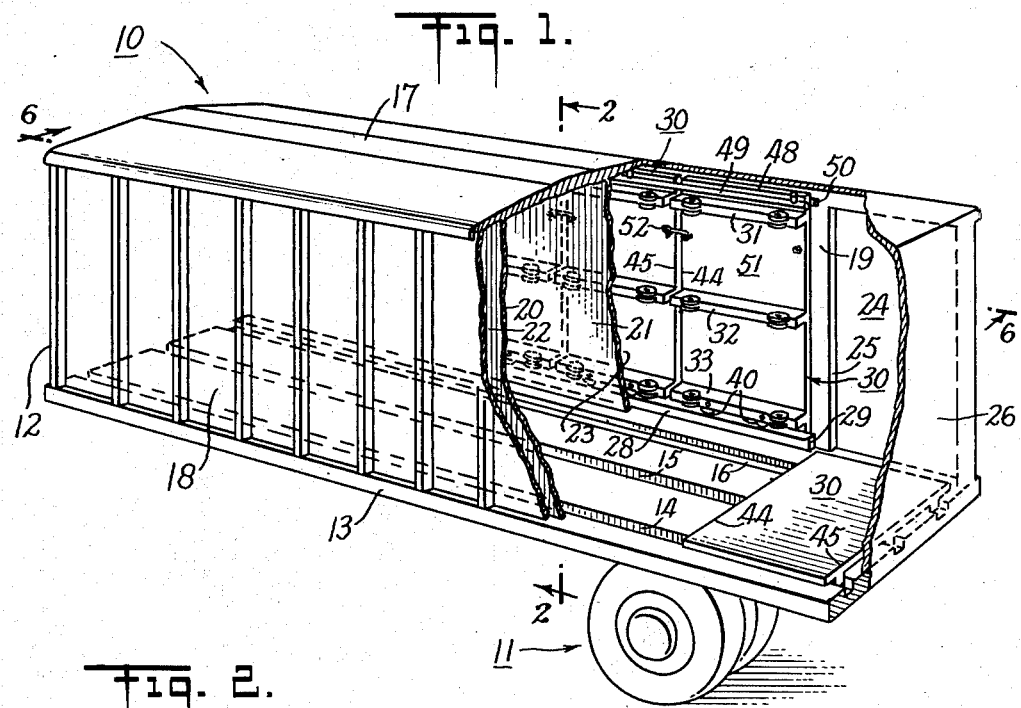
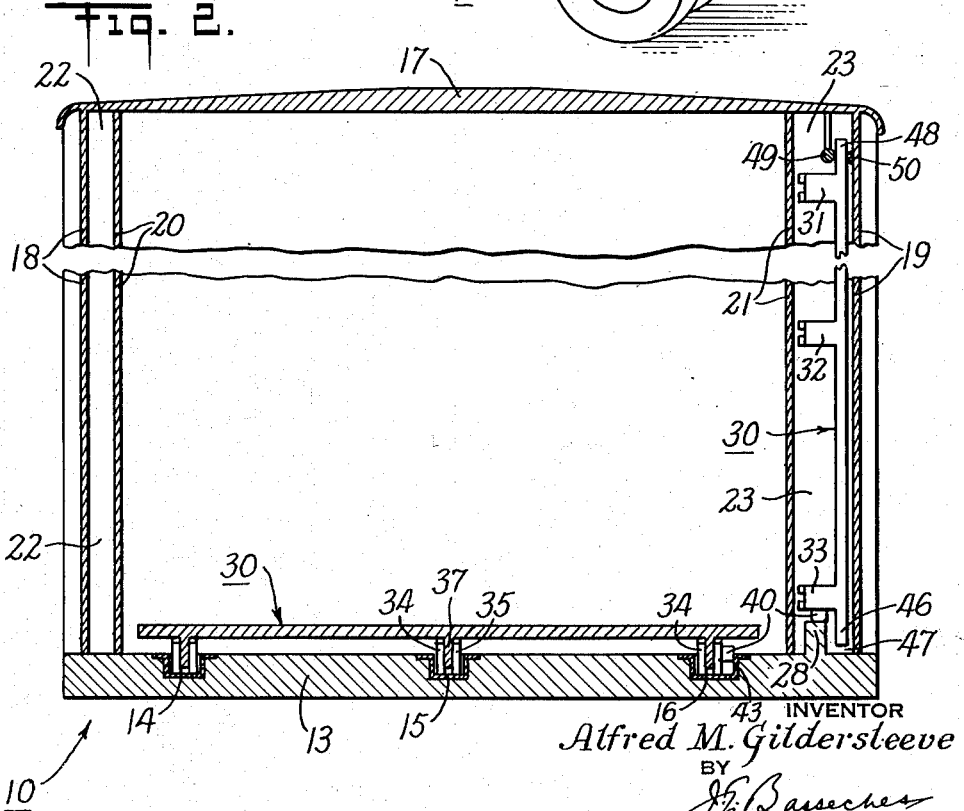
INVENTOR
Alfred M. Gildersleeve
BY
his ATTORNEY

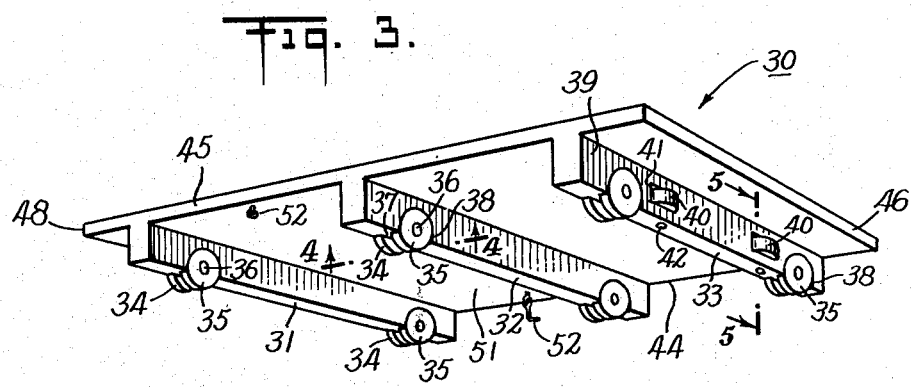

Patented May 11, 1954

2,678,139

UNITED STATES PATENT OFFICE 2,678,139

TRAILER OR LIKE BODY FREIGHT LOADING DEVICE

Alfred M. Gildersleeve, Brooklyn, N. Y.

Application August 25, 1951, Serial No. 243,674

4 Claims. (Cl. 214—83.24)

This invention relates to loading devices and more particularly to vehicles for transporting removable cargoes or payloads, and still more particularly to loading devices for use in trailer truck transporting devices.

My invention has for its object the provision of a trailer construction or like removable load transporting device which will minimize the labor of loading such transporting devices and reduce the time for loading or unloading these vehicles.

My invention has for its object the provision of a truck body construction, particularly of the form commonly referred to as trailer trucks, in which the handling of the load is facilitated, both with regard to the labor involved as well as the time element for loading and unloading, by the provision of cooperative construction of guides and slides for pallet elements and the truck body. Specifically, the invention resides in the provision of the coordinated construction of a compartment of the trailer and the pallets, which members may be fed successively at a loading point in the trailer whereby the load may be stacked on the pallet and readily guided or shifted, so that individual items to be packed in the trailer are not handled or carried throughout the length of the trailer with the incident loss of time and labor. Thus it is an object of my invention to provide in a trailer truck body or the like a storage space construction having details for readily shifting pallets which may be sequentially moved, when empty, adjacent a loading opening in the trailer body and shifted into the desired position when stacked in the body of the trailer away from the loading opening by a series of loads filling a full section of the truck, and, conversely, for unloading the trailer body, to move a stack of the bulk material on a pallet back to and adjacent the loading opening of the trailer, thereby to save the time element incident to carrying each item of the stack, as well as to facilitate the shifting of the stack to and from the loading opening.

In its more specific embodiment of my invention, it is an object thereof to provide a trailer construction and pallets coordinated therewith wherein a chamber of the trailer stores a series of pallets which may be moved in coordinated relation within the chamber of the trailer edgewise to a loading point in the trailer, tilted into the loading position upon guides therefor and, upon being loaded, shifted away from the opening, the guides or rails simplifying the labor of shifting of a load stacked thereon. Conversely, it is an object of my invention to provide a trailer truck provided with guides or rails for readily slidable pallets and means for storing the pallets coordinately arranged by novel structure for use in a series connection whereby a plurality of such pallets may be stored readily for use adjacent a fill opening in the trailer to permit each pallet to be stacked, and with its load shifted away to or from the opening to effect economies with regard to time for loading and unloading and to facilitate the labor involved in such operations.

Still more particularly, it is an object of my invention to provide a pallet for use in loading and unloading trailer trucks which may be shifted readily with its load or edgewise for feeding and storage without its load whereby economies in time of loading and handling are effected and the work of loading and unloading simplified.

To attain these objects and such further objects as may appear herein or be hereinafter pointed out, I make reference to the accompanying drawings, forming a part hereof, in which—

Figure 1 is a perspective view showing a trailer truck body with parts broken away to show details;

Figure 2 is a fragmentary section on the line 2—2 of Figure 1;

Figure 3 is a perspective view of a pallet;

Figure 4 is a section on the line 4—4 of Figure 3;

Figure 5 is a section on the line 5—5 of Figure 3;

Figure 6 is a longitudinal view of the trailer along the line 6—6 of Figure 1.

Making reference to the drawing, I show a trailer body 10 having the usual supporting wheel and axle assembly 11 at its rear to be attached at its forward portion 12 upon an independently articulated chassis having the power plant for pulling the trailer body. The jacking assembly for supporting the forward end of the truck trailer body when disengaged from the hauling chassis assembly is not shown.

In accordance with my invention, the truck floor 13 is formed with a plurality of channels 14, 15 and 16 counter-sunk into the upper surface of the floor 13. Three such channels serving as depressed rails are shown. The trailer is provided with the usual ceiling or top construction 17 and supporting side walls 18 and 19. Spaced from the outer walls 18 and 19 there are provided inside walls 20 and 21 outlining chambers 22 and 23, running longitudinally of the trailer body.

In the installation described, it is contemplated by me to provide a trailer body having loading openings 24 in the side walls next to the tail of the trailer body, in which event the inside walls 20 and 21 terminate adjacent the frame 25 defining the loading opening and which frame has the usual gate or door. It will be understood, however, that the rear wall 26 may be provided with swinging tailgates or doors or a combination of a tailgate and door usually found in such trailer bodies.

Within one or both of the chambers 22 and 23 there is provided a rail 28 providing a guide running longitudinally of the trailer body and spaced from the wall 19 to have its end 29 terminate adjacent the loading door 24 to one side of the frame 25 or for an equivalent length where a tailgate is employed.

With this construction I provide pallets 30, each of which is formed with an undercarriage comprising struts 31, 32 and 33, each having spaced pairs of rollers 34 and 35 mounted on shafts 36 to span a rib 37 of the struts previously described, the rollers being housed within the counter-sunk portions 38 of the struts. It is preferred that the rollers 34 in each instance are flush or within the outer side surfaces of the struts in which they are mounted and are spaced from each other to fit within the channels 14, 15 and 16 previously described.

Strut 33 has formed in its side wall 39 a pair of end thrust rollers 40 each mounted in cutouts 41 upon a vertically extended shaft 42. The channel 16 previously described is of a width which will accommodate the strut 33 and the outwardly projecting portion of the rollers 40, to make rolling contact against the side wall 43 when disposed in the channel 16. The pallet thus described may glide within the channels 14, 15 and 16 for rolling action along the floor, with side thrust rolling action being taken up by engagement of the rollers 40 against the side wall 43 of the channel 16. It will be understood that strut 31 may also be provided with side thrust rollers similar to the rollers 40 described in connection with the strut 33, in which event the channel 14 is widened as in the case of the channel 16.

In accordance with my invention I provide a plurality of pallets 30 which edgewisely may be mounted in contiguous position to span the full length of the truck floor. Thus the edges 44 and 45 of the pallets may be distanced from each other for a length to provide some whole fraction of the length of the truck trailer body. In the illustration I show six such pallets, which may be arranged edgewise along the floor of the trailer body, resting on the rollers 34 and 35 or sidewise to position the rollers 40 on the edge of the rail 28. In this position the side overhanging edges 46 may be housed in the channel 47 between the rail 28 and the wall 19. The opposed overhanging edge 48 engages an upper rail or guide 49 extending from the ceiling holding the pallet cushioned against a spacer block 50. It will be observed that the pallets may be stored in the chamber 23 edgewise and that these pallets will slide readily on the rollers 40 as well as where the rollers 34 and 35 may engage the inner wall 21. Each of the pallets has on the undersurface 51 couplers 52, preferably employing some spring latch coupling means with the complemental engaging elements adjacent the edges 44 and 45. Thus when a plurality of the pallets are positioned within the chamber 23, the couplers integrate each of the pallets to the contiguous one, whereupon, when removing the pallet adjacent the loading opening or tailgate, the entire series will be drawn out to where one is shifted to an accessible position near the frame 25. Upon reaching a position upon the end 29 of the rail, the pallet may be moved from the vertical position to rest within the rails 14, 15 and 16, as previously described by uncoupling the coupling members 52. Thereupon the pallet may be loaded to the ceiling 17 adjacent the opening 24. When stacked to the ceiling capacity, the pallet with its load may be moved forwardly adjacent the forward end 12. Thereupon the process is repeated, drawing a new pallet from within the chamber 23, tilting it to the horizontal position as it reaches the fill opening or tailgate, and repeating the operation. It will thus be observed that the labor of carrying portions of the load to the forward end of the truck is eliminated, the labor of moving the load to the front being effected only when a pallet has been fully stacked. It will be understood that means are provided as each pallet is moved forward to prevent shifting, as by the inclusion of chocks. Other means will suggest themselves and need not be further amplified.

Having thus described my invention and illustrated its use, what I claim as new and desire to secure by Letters Patent is—

1. A trailer truck body or the like having a floor and enclosing outer side wall members for the length of said floor, guide tracks on said floor along which tracks pallets having slide members comprising rollers may be guided to and from a fill opening or gate, the combination therewith of spaced inner means defining a chamber formed adjacent the side wall, including a channel and a guide rail extending along said channel on the truck floor within said chamber within which pallets may be stored contiguously and resting edgewise on said guide rail, said chamber having access means adjacent said fill opening, whereby one pallet at a time may be taken to and from said chamber.

2. A trailer truck body or the like having a floor and enclosing outer side wall members along the length of the truck floor, guide tracks on said floor along which tracks roller equipped pallets having slide members may be guided to and from a fill opening or gate to the interior of the body, the combination therewith of an auxiliary rail positioned to one side of said body side wall and having an end terminating adjacent said fill opening, said rail being spaced from said wall and forming a channel and extending on the truck floor along said body to one side of the truck side wall along which channel the pallets may extend contiguously standing on a side edge thereof to hold the pallets against displacement at the edge on which each stands and holding means adjacent a point spaced from the floor for restraining the pallets against tilting, the end of the rail and channel adjacent said fill opening comprising means for introducing the pallets from said fill opening into and along said channel.

3. A trailer truck body or the like having a floor and enclosing outer side wall members along the length of the truck floor, guide tracks on said floor along which tracks roller equipped pallets having slide members may be guided to and from a fill opening or gate to the interior of the body, the combination therewith of an auxiliary rail positioned to one side of said body side wall and having an end terminating adjacent said fill opening, said rail being spaced from said wall and forming a channel and extending on the truck floor along said body to one side of the truck side wall along which channel the pallets may extend contiguously standing on a side edge thereof to hold the pallets against displacement at the edge on which each stands and holding means adjacent a point spaced from the floor for restraining the pallets against tilting, the end of the rail and channel adjacent said fill opening comprising means for introducing the pallets from said fill opening into and along said channel and said rail having a guide edge arranged to be engaged by edgewisely disposed thrust rollers on the pallets for shifting one pallet at a time from the edgewisely mounted position to and upon the said tracks.

4. A trailer truck body or the like having a truck floor with rails along the length of said floor serving as guides for a plurality of pallets thereon, supporting outer side walls extending along the length of the truck floor from one end to adjacent the other end, an inside wall in parallelism with one of said outer walls spaced for a distance therefrom and defining therebetween a shallow chamber along said truck floor of a depth edgewisely to house said pallets, a frame for said inside and outer side walls defining a truck loading opening and adjacent which frames the said chamber terminates, a channel and guide rail along said side wall on said truck floor within said chamber, the chamber providing storage for a plurality of said pallets, each having side edge supporting means for edgewise support thereof on said guide rail, and the guide rail providing means for shiftingly sliding one of said pallets on said side supporting means adjacent said opening frame.

References Cited in the file of this patent

UNITED STATES PATENTS

| Number | Name | Date |
|---|---|---|
| 679,567 | Lowe | July 30, 1901 |
| 776,623 | Smith | Dec. 6, 1904 |
| 885,162 | Kirchner | Apr. 21, 1908 |
| 970,137 | Thomes | Sept. 13, 1910 |
| 1,240,704 | Greene | Sept. 18, 1917 |
| 1,589,687 | Greene | June 22, 1926 |
| 2,162,192 | Yoder | June 13, 1939 |
| 2,191,222 | Sheehan | Feb. 20, 1940 |
| 2,194,506 | Larsen | Mar. 26, 1940 |
| 2,452,356 | Coit, Jr. | Oct. 26, 1948 |
| 2,465,148 | Coonen | Mar. 22, 1949 |
| 2,534,057 | Pride | Dec. 12, 1950 |